United States Patent
Yerli

(10) Patent No.: US 11,995,730 B2
(45) Date of Patent: *May 28, 2024

(54) SYSTEM AND METHOD FOR PROVIDING DIGITAL REALITY EXPERIENCES AND DECENTRALIZED TRANSACTIONS OF REAL ESTATE PROJECTS

(71) Applicant: THE CALANY HOLDING S. A R.L., Luxembourg (LU)

(72) Inventor: Cevat Yerli, Dubai (AE)

(73) Assignee: THE CALANY HOLDING S. À R.L., Luxembourg (LU)

(*) Notice: Subject to any disclaimer, the term of this patent is extended or adjusted under 35 U.S.C. 154(b) by 0 days.

This patent is subject to a terminal disclaimer.

(21) Appl. No.: 18/195,852

(22) Filed: May 10, 2023

(65) Prior Publication Data

US 2023/0281739 A1 Sep. 7, 2023

Related U.S. Application Data

(63) Continuation of application No. 16/904,015, filed on Jun. 17, 2020, now Pat. No. 11,663,685.

(Continued)

(51) Int. Cl.
*G06Q 50/16* (2012.01)
*G06Q 10/0631* (2023.01)
(Continued)

(52) U.S. Cl.
CPC ..... *G06Q 50/163* (2013.01); *G06Q 10/06313* (2013.01); *G06T 19/006* (2013.01); *H04L 67/01* (2022.05); *H04L 67/10* (2013.01)

(58) Field of Classification Search
CPC ............ G06Q 50/163; G06Q 10/06313; G06T 19/006; H04L 67/01; H04L 67/10
See application file for complete search history.

(56) References Cited

U.S. PATENT DOCUMENTS 6,091,422 A 7/2000 Ouaknine et al.
9,721,386 B1 8/2017 Worley, III et al.
(Continued)

FOREIGN PATENT DOCUMENTS

CN 107885326 A 4/2018
EP 3 232 346 A1 10/2017
(Continued)

OTHER PUBLICATIONS

Non-Final Office Action dated Jun. 3, 2022 issued in U.S. Appl. No. 16/904,112, filed Jun. 17, 2020, 29 pages.
(Continued)

*Primary Examiner* — Seth A Silverman
(74) *Attorney, Agent, or Firm* — BRYAN CAVE LEIGHTON PAISNER LLP

(57) ABSTRACT

Systems and methods for providing digital reality experiences and decentralized transactions of real estate projects, comprising a server with a memory storing data models and data of virtual replicas of real estate properties stored in a project database and instructions for processing the virtual replicas, and a processor configured to process the data to provide digital reality experiences for users; and user devices connected to the server via a network, configured to detect and track virtual objects of the real estate projects and to output media content to users, enabling digital reality experiences. The server and the user devices are further configured to connect to a distributed ledger platform enabling decentralized record of user interactions comprising transactions with the real estate property.

20 Claims, 9 Drawing Sheets

Related U.S. Application Data

(60) Provisional application No. 62/863,116, filed on Jun. 18, 2019.

(51) Int. Cl.
| | | |
|---|---|---|
| *G06Q 50/163* | (2024.01) | |
| *G06T 19/00* | (2011.01) | |
| *H04L 67/01* | (2022.01) | |
| *H04L 67/10* | (2022.01) | |

(56) References Cited

U.S. PATENT DOCUMENTS

| | | | |
|---|---|---|---|
| 10,403,050 B1 | 9/2019 | Beall et al. | |
| 2003/0083957 A1 | 5/2003 | Olefson | |
| 2006/0010005 A1* | 1/2006 | Rowland | G06Q 50/16 |
| | | | 705/313 |
| 2008/0243721 A1* | 10/2008 | Joao | G06Q 40/06 |
| | | | 705/36 R |
| 2008/0249756 A1 | 10/2008 | Chaisuparasmikul | |
| 2010/0030804 A1 | 2/2010 | Behrends et al. | |
| 2010/0285877 A1 | 11/2010 | Corazza | |
| 2012/0038667 A1 | 2/2012 | Branson et al. | |
| 2012/0159350 A1 | 6/2012 | Gaume | |
| 2013/0218542 A1 | 8/2013 | Yerli | |
| 2013/0346151 A1 | 12/2013 | Bleakley et al. | |
| 2014/0221090 A1 | 8/2014 | Mutschler et al. | |
| 2017/0116693 A1 | 4/2017 | Rae et al. | |
| 2017/0140484 A1* | 5/2017 | Lete | G06Q 50/16 |
| 2017/0178272 A1* | 6/2017 | Lashkari | G06T 1/20 |
| 2017/0203438 A1 | 7/2017 | Guerin et al. | |
| 2017/0267099 A1 | 9/2017 | Yerli | |
| 2017/0293705 A1 | 10/2017 | Van der Velden et al. | |
| 2017/0294044 A1 | 10/2017 | Yerli | |
| 2018/0075652 A1* | 3/2018 | Kim | G06T 3/0062 |
| 2018/0096362 A1* | 4/2018 | Kwan | G06F 40/284 |
| 2018/0131907 A1 | 5/2018 | Schmirler et al. | |
| 2018/0322597 A1 | 11/2018 | Sher | |
| 2019/0108580 A1 | 4/2019 | Spivack et al. | |
| 2019/0333174 A1 | 10/2019 | Jung | |
| 2019/0342472 A1 | 11/2019 | Chapman et al. | |
| 2019/0361589 A1 | 11/2019 | Yerli | |
| 2020/0099891 A1 | 3/2020 | Valli et al. | |

FOREIGN PATENT DOCUMENTS

| | | |
|---|---|---|
| EP | 3 318 945 A2 | 5/2018 |
| EP | 3 318 945 A3 | 5/2018 |
| EP | 3 376 361 A2 | 9/2018 |

OTHER PUBLICATIONS

Non-Final Office Action dated Apr. 16, 2021, issued in U.S. Appl. No. 16/604,112, filed Jun. 17, 2020, 27 pages.

Extended European Search Report dated Oct. 27, 2020, issued in European Application No. 20180814.4, 9 pages.

Extended European Search Report dated Apr. 9, 2020, issued in European Application No. 20180829.2, 9 pages.

Non-Final Office Action dated May 10, 2022, issued in U.S. Appl. No. 16/904,015, filed Jun. 17, 2020, 24 pages.

\* cited by examiner

SYSTEM AND METHOD FOR PROVIDING DIGITAL REALITY EXPERIENCES AND DECENTRALIZED TRANSACTIONS OF REAL ESTATE PROJECTS

CROSS-REFERENCE TO RELATED APPLICATION

This application is a Continuation of U.S. patent application Ser. No. 16/904,015, filed Jun. 17, 2020, which claims the benefit of Provisional Application No. 62/863,116, filed Jun. 18, 2019, the entire disclosure of which is hereby incorporated by reference herein for all purposes.

FIELD

The present disclosure generally relates to computer systems. More specifically, the present disclosure relates to three dimensional digital reality experiences

BACKGROUND

Nowadays, potential buyers can search for real estate property on the Internet, where they can view information, photos, videos and descriptions of available properties. However, current Internet-based technologies rely heavily on still images, pre-recorded video, and text presented on web pages, and lack technological solutions for remotely inspecting properties in detail. As a result, for the interested buyer, current real estate visiting methods are constrained by time availability for the visitor, geography (e.g., living far from the desired property), and the resources required for attending the appointment. For the seller, it can be very inconvenient to have many strangers visiting their property.

Also, a potential buyer who already visited a property once might want to revisit that property and spend more time exploring it before closing a transaction, but is unwilling to create inconveniences for the owner with additional visit time. In addition, in order to estimate the value of land, investors may typically need to be very well educated in the real estate business to analyze how the area may develop in the future and its effects on price behavior and trends. Moreover, current real estate investment methods do not typically provide the flexibility to purchase land fractionally in an efficient way, limiting investors' options to purchase tens, hundreds, or even thousands of square meters in a single transaction, which can be inflexible and inconvenient.

What is needed are systems and methods providing more flexible options for users to visit, select, and invest in real estate projects while offering a realistic experience.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The current disclosure addresses one or more drawbacks in the background or other technical problems through systems and methods for providing present and future real estate projects to potential investors in a digital reality, such as in virtual, augmented, or mixed reality. The system can employ, amongst others, a cloud-to-edge network infrastructure, distributed computing capabilities for storing and processing virtual replicas of real estate properties, and decentralized record-keeping through distributed ledgers. The system and method of the current disclosure provides digital reality experiences for visiting and performing transactions on existing or future (e.g., planned but unbuilt) real estate property, including property in the surrounding areas of a target property. Thus, investors may not need to possess specialized skills and knowledge in real estate, as most information would be available to them in the present and from potentially any place in the world, enabling them to better assess the present and future value of the property. The systems and methods further enable decentralized transactions through distributed ledger-based smart contracts that provide users with securely-encrypted, transparent transaction records that further enable fractional ownership of the real estate properties.

A system for providing digital reality experiences and decentralized transactions of real estate projects comprises a server having a memory and a processor, the memory storing data models and data of virtual replicas of real estate properties associated with real estate projects stored in a project database and instructions for processing the virtual replicas, and the processor being configured to process the data to provide digital reality experiences for users; and user devices connected to the server via a network, the devices being configured to detect and track virtual objects associated with the real estate projects and to output media content to users enabling digital reality experiences. The server and the user devices are further configured to connect to a distributed ledger platform enabling decentralized record of user interactions comprising transactions with the virtual replicas, further enabling fractional property ownership. The user devices may be one or more mobile devices, personal computers, game consoles, smart contact lenses, media centers, and head-mounted displays.

According to an embodiment, a plurality of replicated environments comprising virtual replicas of the real world stored in the memory of the server may form a virtual world system, which may be accessed by users in any of virtual reality, augmented reality, or mixed reality. The virtual world system may thus comprise not only virtual replicas of the real estate projects, but of other objects that may relate to the real estate projects in the surrounding areas, such as houses, streets, traffic, and people, providing a user with a virtual experience close to the real experience of being present at the real estate property. The plurality of real estate projects may be available in a real estate project marketplace hosted in the server, which may allow users to visualize the plurality of real estate projects and may thereafter decide whether to physically or remotely (e.g., in virtual reality) visit a project and to perform transactions thereon. The marketplace can connect to a distributed ledger platform so that each transaction performed on the real estate assets can be securely recorded based on a ledger-based smart contract.

The distributed ledger platform of the current disclosure enables a virtual economy that allows sharing, transacting, and monetizing real estate assets through cryptocurrencies, the transactions being arranged in ledger-based smart contracts stored and protected in the distributed ledger. Thus, each transaction performed by a user on a real estate asset may be recorded in ledgers, or blocks, which are growing list of records linked and secured using cryptography to form blockchains. Each block may contain a hash pointer as a link to a previous block, a timestamp, transaction data, and other data pertaining to the real estate property transaction. Blockchains may be designed to be resistant to modification of the data and can serve as an open, distributed ledger that can record transactions between two parties efficiently and in a verifiable and permanent way.

According to an embodiment, the system of the current disclosure may use a cloud to edge infrastructure that may implement distributed computing capabilities employing public or private clouds, fog servers, and edge devices and systems, such as enterprise systems, mobile platforms, and user devices, all of which may connect through a network. This way, resources including physical servers and network equipment enable a shared storage and computing that may be dynamically allocated depending on factors such as the distance of the user to the resources and the network and computational demand from the users.

According to an embodiment, the virtual replicas represent real estate projects selected from the group consisting of unbuilt real estate projects, already-built real estate projects, or combinations thereof. In an embodiment of an unbuilt real estate project, a user may virtually or physically visit a real estate property that has not yet been built, and may view via the user device in virtual reality, augmented reality, or mixed reality, the virtual replicas representing the real estate project, providing potential investors with a digital reality experience comprising visiting and exploring the real estate property to assist in their investment decision. In an embodiment of an already-built real estate project, the user may virtually or physically visit an already-built real estate project and view in virtual reality, augmented reality, or mixed reality the real estate project. In an embodiment combining unbuilt and already-built real estate projects, a user may virtually or physically visit a real estate property, and may view via the user device in virtual reality, augmented reality, or mixed reality, unbuilt parts of the real estate project that may be retrieved as media content from the server and output by the user device virtually, whereas the already-built part may be viewed by the user in real life, completely in virtual reality, or may be augmented in augmented reality through virtual elements. Combining both the built and unbuilt parts of a real estate project may provide users with a full experience of how the real estate project may look like after full completion.

According to an embodiment, the digital reality experiences provided to users further comprise visualizing and performing transactions on real estate properties in the areas surrounding a target real estate property. In some embodiments, permissions for visiting and transacting other real estate projects apart from the target real estate project are based on user or real estate property entitlement. For example, a user may access the real estate property marketplace and select a specific project. The user may physically or virtually visit the project, while simultaneously being able to view and visit other projects in the surrounding area and perform transactions thereon.

According to an embodiment, a plurality of objects of already-built real estate properties comprise connected devices with sensing mechanisms configured to obtain real-time data from the real objects to enrich and synchronize the virtual replicas and provide further data to users. The connected devices may refer to any computing device or machine that can be connected to a network, can communicate with each other, and which receives information from a plurality of sources (e.g., sensors or other computing devices), a technological concept known nowadays as the Internet of Things (IoT), and such devices can be referred to as IoT devices. The sensing mechanisms that may be installed on the plurality of objects may include one or more temperature sensors, proximity sensors, inertial sensors (e.g., inertia measuring units, accelerometers, gyroscopes, and magnetometers), infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. By providing a plurality of connected devices with sensing mechanisms constantly capturing data from the real world, the virtual world and each of the synchronized virtual replicas are kept updated with real-time, multi-source data that mirror the conditions of the real world. The multi-source data includes capturable data of each real-world element, comprising one or more of 3D image data, 3D geometries, 3D entities, 3D sensory data, 3D dynamic objects, video data, audio data, chemical composition, waste production data, textual data, time data, positional data, orientational data, velocity data, temperature data, humidity data, pollution data, lighting data, volume data, flow data, chromatic data, power consumption data, bandwidth data, and mass data, amongst others.

According to an embodiment, the virtual replicas of the real estate projects comprise data and models that provide self-computing capabilities and autonomous behavior, the data and models being input through a plurality of software platforms and software engines. Data are the attributes of the virtual replicas and the models are the graphical, mathematical and logic representations of any aspect of the corresponding real-world element. In the current disclosure, a model is any graphical, mathematical or logical representation of aspects of the reality that may be used to replicate the reality in the virtual world system.

In some embodiments, suitable models comprise one or more of a 3D model, dynamic model, geometric model, and machine learning model. The models and data may be input via a plurality of external platforms or engine services included in the virtual world system. The plurality of external platforms may include, for example, an Internet of Things (IoT) platform, machine learning (ML) platform, big data platform, and simulation platform, which may connect to the virtual world system through application programming interfaces (APIs) and software development kits (SDKs), in order to provide models and data to the virtual replicas. The engines included in the virtual world system may include an artificial intelligence engine, a simulation engine, a 3D engine, and a haptic engine, amongst others. The virtual world system also connects to a spatial data streaming platform configured to receive and manage spatial data from the real-world elements, or may input directly into the virtual world system. The system may further comprise digital reality interfaces, such as virtual reality, augmented reality, and merged reality interfaces to interact with the merged reality or virtual reality.

According to an embodiment, the real estate marketplace comprises a plurality of modules that enable user interaction with the real estate properties. The plurality of modules and data required for each module may be stored in the memory of the server and may be updated by the multi-source data captured by the sensing mechanisms. The plurality of modules of the real estate marketplace may comprise, for example, map/area search module, a keyword search module, a parameter filtering module, and a recommender module. Once a target real estate property has been selected, further modules may be displayed to a user, such as a simulation module, a transactions module to enable transactions between users and real estate properties, and an appraisal module to add a personal evaluation of the real estate projects so that other users can use in their investment decision. The simulation module may further comprise a utilities projection module, prices projection module, and surrounding area developments module.

The map/area search module may enable users to search for a real estate project by using an interactive map comprising real-world spatial data of the property. The keyword search module uses keyword search algorithms to retrieve from the marketplace database keywords that match the description of the search and accordingly provide the options to the users. The parameter filtering module filters preferences based on one or more parameters selected by the user. The recommender module may enable providing ranking and filtering of projects to users through collaborative filtering or simulated filtering, which may be run by the server via simulation engines or through external platforms connected to the system via a network through suitable APIs or SDKs. Collaborative filtering enables recommending and filtering projects based on collecting and analyzing a large amount of information on users behaviors, activities or preferences and predicting what users will like based on their similarity to other users. For example, collaborative filtering may be based on comparing positive or negative appraisals of real estate projects and then matching projects related to the user's preferences for making recommendations. Collaborative filtering may use algorithms such as k-nearest neighbor (k-NN) and Pearson Correlation, for example. Simulated filtering may enable running goal-based simulations of a city and then matching the simulation results with the projects that best fit the needs of the city in order to provide recommendations and corresponding ranking and filtering. For example, simulated filtering may simulate and filter preferences based on utility costs projections and real estate prices projections.

Once a target real estate property has been selected, the simulation module may provide users with a utilities projection module, which uses historical records of consumption data of utilities such as water, electricity, or gas, for a predetermined period of time. In further embodiments, the historic utilities consumption and real-time data are processed by the processor of the server to simulate utility consumption behavior and estimated costs for users to use during an investment decision. Hence, a user may approach a real estate project and may view the history utility costs of each of the different real estate projects. The real estate price projection module may base real estate price simulations on a historical real estate price and future developments that may affect the real estate project price. The surrounding area developments module may use data from a city administration in order to simulate and integrate future developments of the real estate in the area surrounding the target real estate property. This data may also be used in the prices projection module.

In some embodiments, in order to reduce hardware and network demands, contribute to the reduction of network latency, and improve the general merged reality experience, the system may connect through a network including millimeter-wave (mmW) or combinations of mmW and sub 6 GHz communication systems, such as $5^{th}$ generation wireless systems communication networks (5G). In other embodiments, the system may connect through wireless local area networking (Wi-Fi) providing data at 60 GHz. Provided communication systems may allow for about low (e.g., 1 to about 5 millisecond) end-to-end (E2E) latency and high (e.g., 1-10 Gbps) downlink speeds to end points in the field, complying with parameters necessary for executing the typically highly-interactive digital reality applications or other highly-demanding applications. This results in high-quality, low latency, real-time digital application content streaming. In other embodiments, the system may communicatively connect through 4th generation wireless systems communication (4G), may be supported by 4G communication systems, or may include other wired or wireless communication systems.

According to an embodiment, a method enabling digital reality experiences and decentralized transactions of real estate projects comprises developing virtual replicas of real estate projects and storing the virtual replicas in a memory of a server, the virtual replicas comprising data models and data of the real estate projects and instructions for processing the virtual replicas by a processor; visiting, employing a user device, a real estate project; identifying, by the user device, virtual replicas within a real estate project; retrieving real estate project media content comprising the virtual replicas and outputting the content to the user via the user device; interacting with the media content; and recording interactions comprising transactions with the virtual replicas in a distributed ledger.

A computer readable medium having stored thereon instructions configured to cause one or more computing devices, such as a server system or client device, to perform any of the methods disclosed herein is also disclosed.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
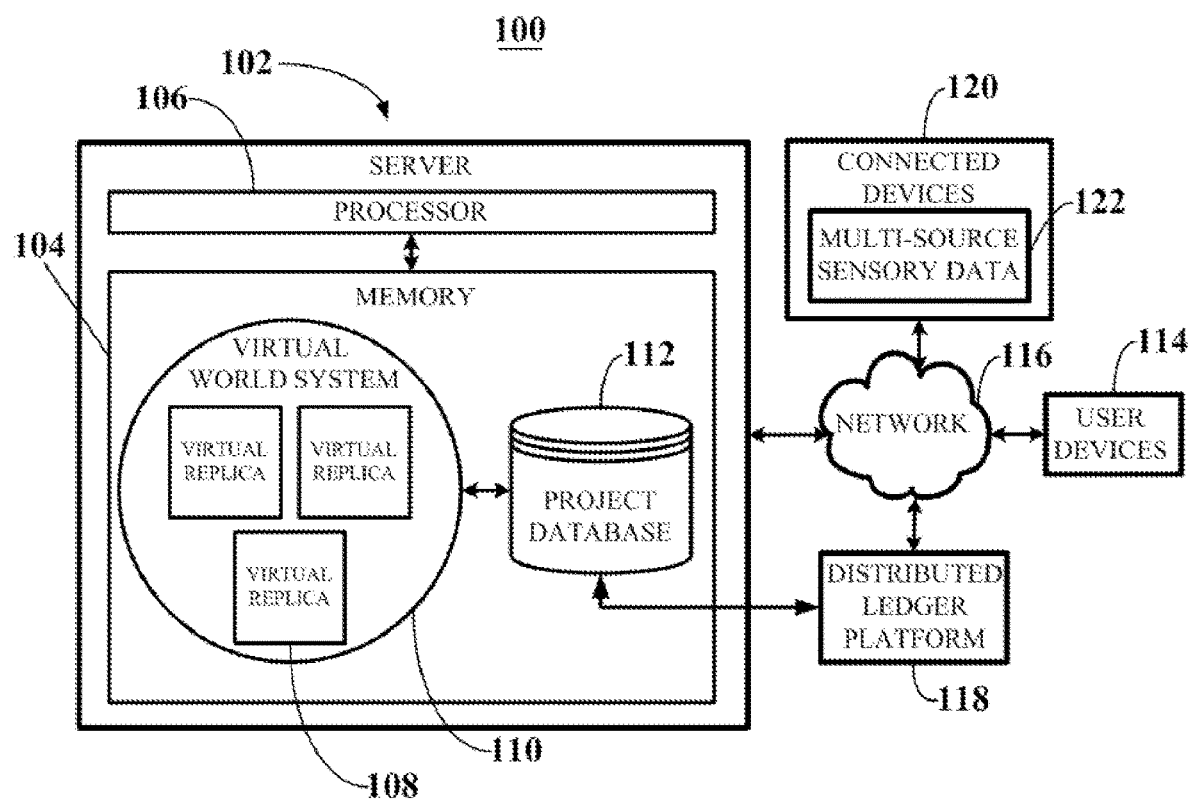
FIG. 1 depicts a schematic representation of system for providing digital reality experiences and decentralized transactions of real estate projects, according to an embodiment.

FIG. 1 depicts a schematic representation of system 100 for providing digital reality experiences and decentralized transactions of real estate projects, according to an embodiment.

The system 100 for providing digital reality experiences and decentralized transactions of real estate projects comprises a server 102 comprising a memory 104 and a processor 106, the memory 104 storing data models and data of virtual replicas 108 of real world elements included in a virtual world system 110 that replicates the real world and instructions to process the virtual replicas 108. The memory 104 further stores a project database 112 that includes the virtual replicas 108 of real estate properties. The processor 106 is configured to process the data to provide digital reality experiences for users. The server 102 connects to one or more user devices 114 via a network 116, the user device 114 being configured to detect and track virtual replicas 108 of the real estate projects or other related virtual objects (e.g., ads, movie clips, etc.) and to output media content to users enabling digital reality experiences. In some embodiments, the server 102 is further configured to connect to a distributed ledger platform 118 enabling decentralized record of the life-cycle of the virtual replicas 108 of the real estate properties and of user interactions (e.g., transactions) with media content comprising the virtual replicas 108. The user devices 114 may be one or more mobile devices, personal computers, game consoles, media centers, and head-mounted displays. Although the system 100 is described as including a single server 102 in examples disclosed herein, it will be understood that functions described herein as being performed by a single server (e.g., server 102) may instead be performed by server system 202 comprising multiple server computers, or vice versa.

According to an embodiment, a plurality of objects of already-built real estate properties comprise connected devices 120 with sensing mechanisms configured to obtain real-time data 122 (e.g., sensor data) from the real objects to enrich and synchronize the virtual replicas 108 and provide further data to users. The connected devices 120 may be any computing device or machine that can be connected to a network, can communicate with each other, and which receives information from a plurality of sources, a technological concept known nowadays as the Internet of Things (IoT), and such devices can be referred to as IoT devices. Examples of such connected devices 120 comprise surveillance cameras, vehicles, traffic lights, buildings, streets, train-tracks, home appliances, and the like. The sensing mechanisms that may be installed on the plurality of objects may include one or more temperature sensors, proximity sensors, inertial sensors (e.g., inertia measuring units, accelerometers, gyroscopes, and magnetometers), infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. By providing a plurality of connected devices 120 with sensing mechanisms constantly capturing data from the real world, the virtual world and each of the synchronized virtual replicas 108 are kept updated with real-time, multi-source data that mirror the conditions of the real world. The multi-source data includes capturable data of each real-world element, comprising one or more of 3D image data, 3D geometries, 3D entities, 3D sensory data, 3D dynamic objects, video data, audio data, chemical composition, waste production data, textual data, time data, positional data, orientational data, velocity data, temperature data, humidity data, pollution data, lighting data, volume data, flow data, chromatic data, power consumption data, bandwidth data, and mass data, amongst others.

Virtual replicas 108 may obtain data from one or more sources (e.g., from one or more real-world elements, environmental sensors, computing devices, etc.). As used herein, the term "multi-source" refers to data that may be obtained from multiple sources. Virtual replicas may be updated based on multi-source data, such as by updating known parameters or features, by enriching the virtual replicas with additional parameters or features, or the like. In the current disclosure, the term "enriching" is used to describe the act of providing further properties to a virtual replica based on multi-source data. Enriching a virtual replica may be considered a special form of updating the virtual replica with one or more new forms of data that may not have been previously present in the virtual replica. For example, enriching the virtual replicas may refer to providing real-world data captured from sensing mechanisms on the plurality of connected devices 120, wherein the further real-world data comprises video data, temperature data, real-time energy consumption data, real-time water consumption data, or the like.

Figure 2:
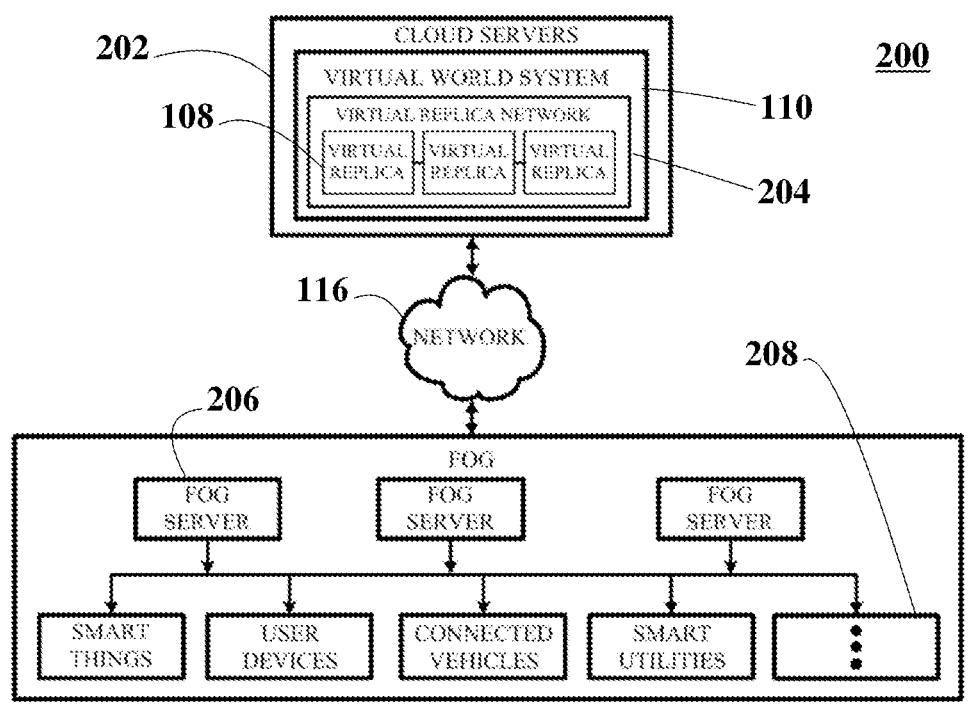
FIG. 2 depicts a schematic representation of a cloud-to-edge architecture of a system for providing digital reality experiences and decentralized transactions of real estate projects, according to an embodiment.

FIG. 2 depicts a schematic representation of a cloud-to-edge infrastructure 200 of a system for providing digital reality experiences and decentralized transactions of real estate projects, according to an embodiment. Some elements of FIG. 2 may refer to similar or the same elements of FIG. 1 and thus may use the same reference numbers.

A cloud-to-edge infrastructure 200 of the current disclosure comprises one or more servers, such as cloud servers 202, configured to store and process input data, the one or more cloud servers 202 comprising a virtual world system 110 storing virtual replicas 108 of real world elements. A plurality of connected virtual replicas 108 forms a virtual replica network 204, which enable the establishment of peer-to-peer (P2P) connections either through direct physical communications or through indirect virtual replica-based connections.

In the current disclosure, the term "virtual replica" refers to accurate and persistent virtual representations of real-world elements. In an embodiment, the virtual replicas 108 of the current disclosure refer to a virtual version, or virtual twin, of a real-world element, or real twin, which may either be mapped or modeled through computer assisted drawing (CAD) or computer assisted engineering (CAE) methods, input by computer models of the real objects (e.g., building information models—BIMs) or through other suitable prior art methods, and which may mirror not just the appearance but also the behavior and functions of the real twin. The real-world objects may additionally include sensors that can provide the virtual replicas 108 with multi-source input data for enriching and synchronizing the virtual replicas 108 with their respective real counterpart.

In some embodiments, a virtual replica 108 includes one or more of 3D world and building data, such as SLAM or derivate-mapping based data; 3D geometry data; 3D point cloud data; or geographic information system data representing real-world structural properties that may serve to model a 3D structure for digital reality applications.

For example, a specific traffic light in a city is linked to a road or street and can be associated also to other objects, such as sensors or other traffic signals. These relationships can trigger events that may create new interactions in the virtual world system 110, for example, an emergency car in a street can automatically trigger a priority event that will change the traffic lights pattern to avoid any stops in the intersections based on the simulation of the trajectory of the emergency car and the actual traffic conditions in the area.

The cloud-to-edge infrastructure 200 that may implement distributed computing capabilities employing public or private clouds, fog servers 206, and edge devices 208 from systems such as enterprise systems, mobile platforms, and user devices, all of which may connect through a network 116. Using the cloud-to-edge infrastructure 200, access to computing power, computer infrastructure (e.g., through so-called infrastructure as a service, or IaaS), applications, and business processes can be delivered as a service to users via client devices on demand. This way, resources including physical servers and network equipment enable a shared storage and computing that may be dynamically allocated depending on factors such as the distance of the user to the resources and the network and computational demand from the users.

According to an embodiment, tracking of devices is performed by one or more of time of arrival (TOA), angle of arrival (AOA), and visual imaging techniques. The tracking may be performed by one or more of radar technology, antennas, Wi-Fi, inertia measuring units, gyroscopes, and accelerometers.

In some embodiments, in order to reduce hardware and network demands, contribute to the reduction of network latency, and improve the general merged reality experience, the system may connect through a network 116 including millimeter-wave (mmW) or combinations of mmW and sub 6 GHz communication systems, such as $5^{th}$ generation wireless systems communication networks (5G). In other embodiments, the system may connect through a wireless local area networking (Wi-Fi) providing data at 60 GHz. Provided communication systems may allow for low (e.g., about 1 to about 5 millisecond) end-to-end (E2E) latency and high (e.g., 1-10 Gbps) downlink speeds to end points in the field, complying with parameters necessary for executing the typically highly-interactive digital reality applications or other highly-demanding applications. This results in high-quality, low latency, real-time digital application content streaming. In other embodiments, the system may communicatively connect through 4th generation wireless systems communication (4G), may be supported by 4G communication systems, or may include other wired or wireless communication systems.

In other embodiments, global navigation satellite systems (GNSS), which refers generally to any satellite-based navigation systems like GPS, BDS, Glonass, QZSS, Galileo, and IRNSS, may be used for enabling positioning of devices. Employing signals from a sufficient number of satellites and techniques such as triangulation and trilateration, GNSS can calculate the position, velocity, altitude, and time of devices. In an embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, preferably, but not limited to, providing data at 60 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of devices is implemented by a combination of AGNSS and inertial sensors in the devices.

In some embodiments, each of the virtual replicas may be geolocated using a reference coordinate system suitable for use with current geolocation technologies. For example, the virtual replicas may use a World Geodetic System standard such as WGS84, which is the current reference coordinate system used by GPS.

Figure 3:
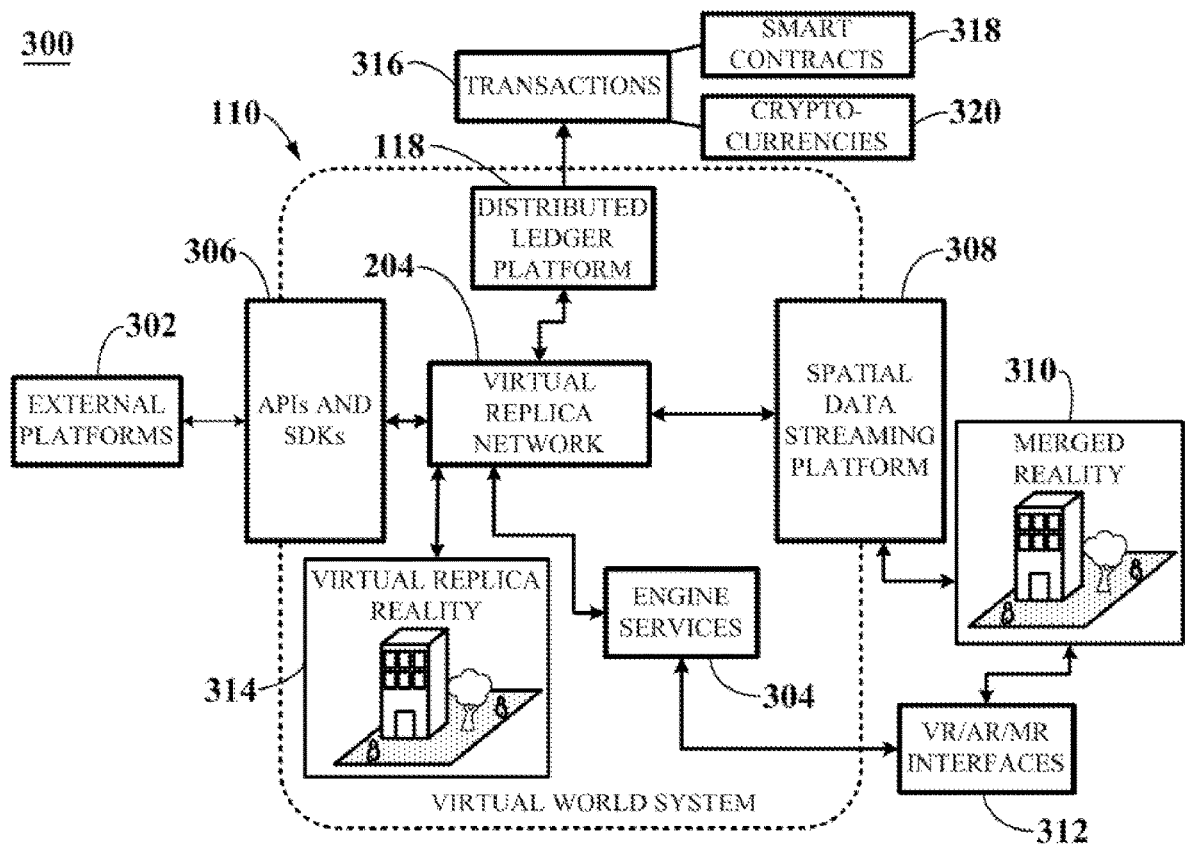
FIG. 3 depicts a schematic representation depicting platforms and interfaces used to generate virtual replica networks used in a system for providing digital reality experiences and decentralized transactions of real estate projects, according to an embodiment.

FIG. 3 depicts a schematic representation of a system 300 comprising platforms and interfaces used to generate virtual replica networks used in a system for providing digital reality experiences and decentralized transactions of real estate projects, according to an embodiment. Some elements of FIG. 3 may refer to similar or the same elements of FIGS. 1-2 and thus may use the same reference numbers.

With reference to FIG. 3, the elements located within the dotted lines represent the virtual world system 110 where virtual replicas 108 and virtual replica networks 204 reside.

As viewed in FIG. 3, the virtual replica network 204 can connect to a plurality external platforms 302 or to engine services 304 included in the virtual world system 110. The plurality of external platforms may include, for example, an Internet of Things (IoT) platform, machine learning (ML) platform, big data platform, and simulation platform, which may connect to the virtual world system 110 through application programming interfaces (APIs) and software development kits (SDKs) 306, in order to provide models and data to the virtual replicas.

The IoT platforms refer to software and/or hardware that enable the management of multi-source input data received from sensors in connected devices and user devices. The ML platform refers to software and/or hardware that enable providing the virtual replicas 108 with machine learning models and algorithms for artificial intelligence applications. The big data platform refers to software and/or hardware that enables organization in developing, deploying, operating and managing big data related to the virtual replica network 204. The simulation platform refers to software and/or hardware that enable using the virtual replicas 108 and their data and models in order to virtually recreate the real behavior of the real-world entities.

The engine services 304 included in the virtual world system 110 may include an artificial intelligence engine, a simulation engine, a 3D engine, and a haptic engine, amongst others. In an embodiment, the artificial intelligence engine includes software and/or hardware that enables the management and application of machine learning models and algorithms for artificial intelligence applications. In an embodiment, the simulation engine includes software and/or hardware that enable using virtual replicas 108 and their data and models in order to virtually recreate the real behavior of the real-world entities. In an embodiment, the 3D engine includes software and/or hardware that may be used in the creation and processing of 3D graphics of the virtual replicas 108. In an embodiment, the haptic engine includes software and/or hardware that enables implementing haptic features to applications and virtual replicas 108 to provide an interaction that responds to touch by user devices. The virtual world system 110 also connects to a spatial data streaming platform 308 configured to receive and manage spatial data from the real-world elements or input directly into the virtual world system 110.

The engine services 304 may connect to a merged reality 310 via suitable digital reality interfaces 312, such as virtual reality, augmented reality, or mixed reality interfaces. The merged reality 310 provides user devices with a combination of real elements where virtual elements may overlap or augment the reality of user devices. The virtual replica network 204 also connects directly within the virtual world system 110 to an implementation of virtual replica reality 314, where all real-world elements are completely virtual and may be virtually enhanced (e.g., adding features to the virtual replicas 108 that the real-world elements may not have). In the current disclosure, the virtual replica reality 314 differs from the typical concept of virtual reality, in that virtual reality may represent an immersive realization of the world where all elements are virtual, while the virtual replica reality 314 takes into account the context, interactions and connections between the virtual replicas, which are kept continuously updated through the data and models input and manipulated via the plurality of platforms and/or engines.

The data and models input through the various platforms and/or engines of the virtual world system provides self-computing capabilities and autonomous behavior of virtual replicas 108, synchronized behavior between the virtual twins and real twins, enhanced capabilities of the real twins through the virtual replicas 108, and enables employing the data obtained from the real-world objects to perform simulations and machine learning training and inference in order to perform system optimizations.

The virtual replica network 204 further connects to a distributed ledger platform 118 that enables automatically managing and recording transactions 316 via ledger-based smart contracts 318, as well as managing the exchange of cryptocurrencies 320 resulting from the transactions.

Figure 4:
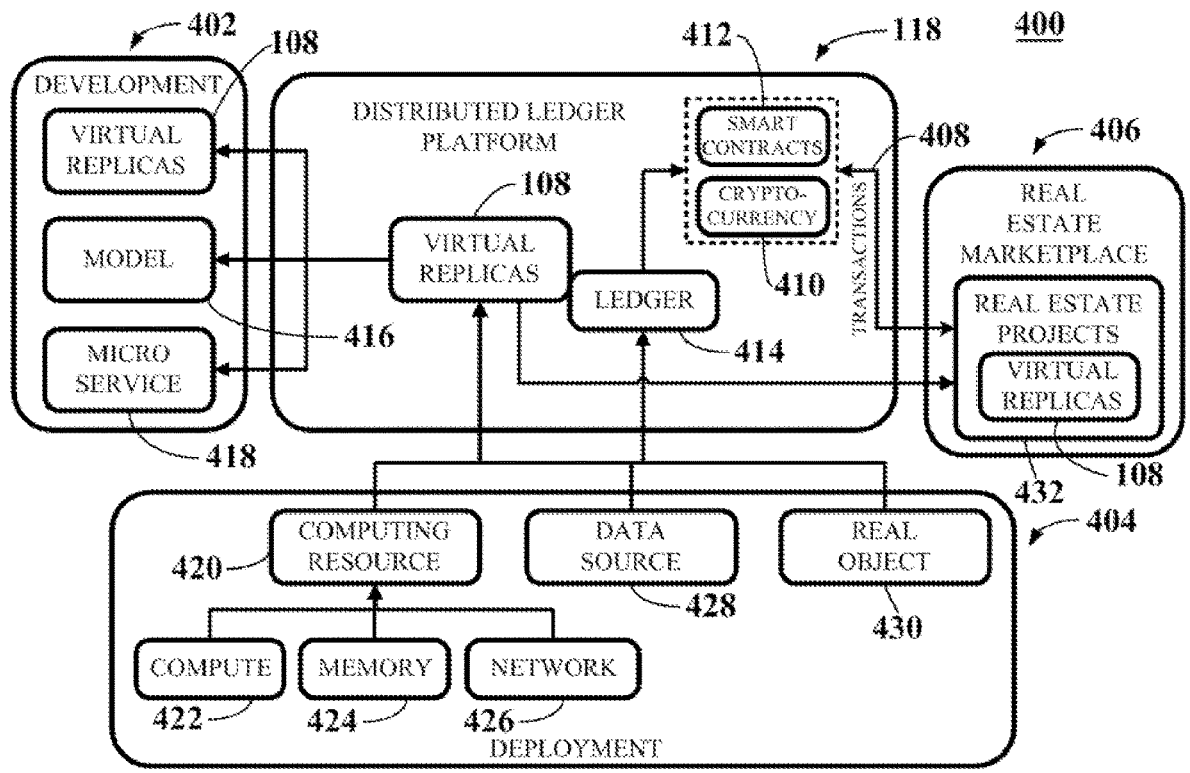
FIG. 4 depicts a schematic representation depicting a distributed ledger platform used for recording decentralized transactions of real estate projects, according to an embodiment.

FIG. 4 depicts a schematic representation depicting a system 400 comprising a distributed ledger platform 118 used for recording decentralized transactions of real estate projects, according to an embodiment. Some elements of FIG. 4 may refer to similar or the same elements of FIGS. 1-3 and thus may use the same reference numbers.

The system 400 comprises a plurality of modules connected to the distributed ledger platform 118, such as a development module 402, a deployment module 404, and a real estate marketplace 406.

The distributed ledger platform 118 of the current disclosure enables implementation of a virtual economy that allows sharing, performing transactions 408, and monetizing real estate assets through cryptocurrencies 410, the transactions 408 being arranged in ledger-based smart contracts 412 stored and protected in the distributed ledger platform 118. Thus, each transaction 408 performed by a user on a real estate asset may be recorded in ledgers 414, or blocks, which are growing list of records linked and secured using cryptography to form blockchains. Each block may contain a hash pointer as a link to a previous block, a timestamp, transaction data, and other data pertaining to the real estate property transaction 408. Blockchains may be designed to be resistant to modification of the data and can serve as an open, distributed ledger that can record transactions between two parties efficiently and in a verifiable and permanent way.

The development module 402 of system 400 supports crowdsourcing techniques to collaboratively develop virtual replicas 108, models 416 that can be used by the virtual replicas 108, and micro services 418 via, for example, SDKs and APIs, to create new content for the virtual world system that can be used in the real estate marketplace 406.

In an embodiment, the models 416 include any graphical, mathematical or logical representation of aspects of the reality that may be used to replicate the reality in the virtual world system. In some embodiments, suitable models 416 comprise one or more of a 3D model, geometric model, dynamic model, and machine learning model. In some embodiments, the system may be adapted to implement fewer or more models than those presented.

The 3D model goes in hand with the geometric model to show data included in each of the geometries of the virtual replica 108, such as textures, colors, shading, reflection, collision effects, and the like. The 3D models comprise the 3D data structure that is used to visually represent the virtual replicas 108 and other virtual elements in the virtual world system, such as applications, ads, virtual bots, etc. The 3D data structure may include, for example, one or more octrees, quadtrees, BSP trees, sparse voxel octrees, 3D arrays, kD trees, point clouds, wire-frames, boundary representations (B-Rep), constructive solid geometry trees (CSG Trees), bintrees, and hexagonal structures. The 3D data structure serves the function of accurately and efficiently representing the data of each of the geometries of the virtual objects in the virtual world system. The geometric model comprises the mathematical model defining the shape of the virtual replica 108 based on the real-world element, and may be complemented by the 3D model.

The dynamic model represents the mathematical model describing the behavior of the real-world objects in the virtual world over time, may comprise a set of states that occur in a defined sequence, and may comprise continuous (e.g., algebraic or differential equations) and discrete (e.g., as state-machine or stochastic models) dynamics models. The machine learning model is a mathematical representation of the real-world objects and processes, normally generated by a machine learning algorithm based on actual or simulated data that have been used as training data to learn from. This model may enable implementation of artificial intelligence techniques that can be used to optimize the operation and/or performance of the real twin through the virtual twin.

In some embodiments, the models used in the virtual replicas 108 take into account the level of detail (LOD) required by a specific scenario computation. LOD involves decreasing the complexity of a 3D model representation as the model moves away from the viewer, or according to other metrics such as object importance, viewpoint-relative speed, or position. LOD is a feature typically used in game engines to optimize real-time rendering, using more detailed models only where the point of view of the user is closer to the object. LOD management increases the efficiency of computing processes, such as the rendering process by decreasing the workload on graphics pipeline usage, typically vertex transformations, or by enhancing physical simulations, as different physical models can be associated to the virtual replicas 108, from low to high fidelity models, enabling different simulations to be performed depending on the case and situation LOD management allows also to provide an optimized user experience, depending on the specific requirements and context.

In an embodiment, microservices 418 include individual services that can be developed, deployed and maintained independently, each service being configured to perform discrete tasks and communicating with other services through APIs. Each microservice 418 can update data of the virtual replicas 108 using the virtual replica models and relationships with the environment to modify the value of specific attributes of the virtual replicas 108. Microservices 418 can use specific core services of the virtual world system, such as a plurality of engines, or be connected to external platforms.

The deployment module 404 of system 400 can leverage connected computing resources 420, such as compute 422, memory 424, and network 426 for sharing with the distributed ledger platform 118, allowing the system 400 to offer a shared pool of computing resources 420 that can enable system optimization. The deployment module 404 also allows sharing data sources 428 and deploying the virtual replicas 108 on the corresponding real objects 430. The deployed virtual replicas 108 can be made available within one or more real estate projects 432 of the real estate marketplace 406.

Sharing of resources such as virtual replicas 108, models 416, microservices 418, and computing resources 420 can be monetized through cryptocurrencies 410 and regulated by smart contracts 412. For example, a developer may get cryptocurrency tokens each time his/her model 416 is used in a simulation or transaction.

Figure 5A:
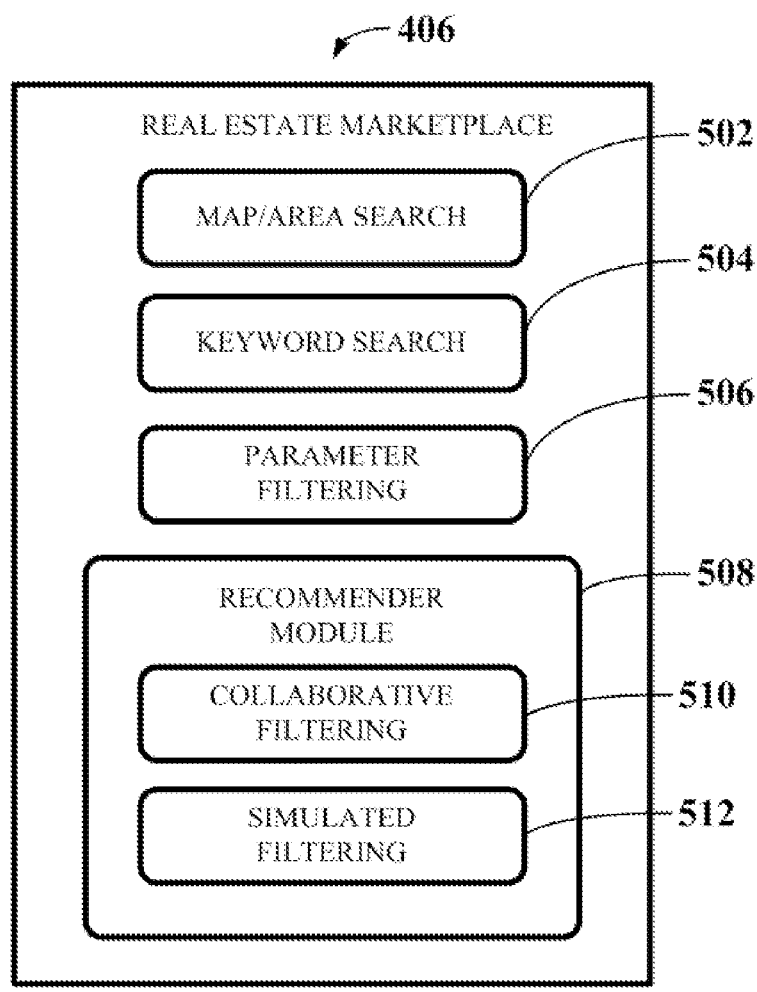
FIGS. 5A-5B depict schematic representations of modules of the real estate marketplace, according to an embodiment.
Figure 5B:
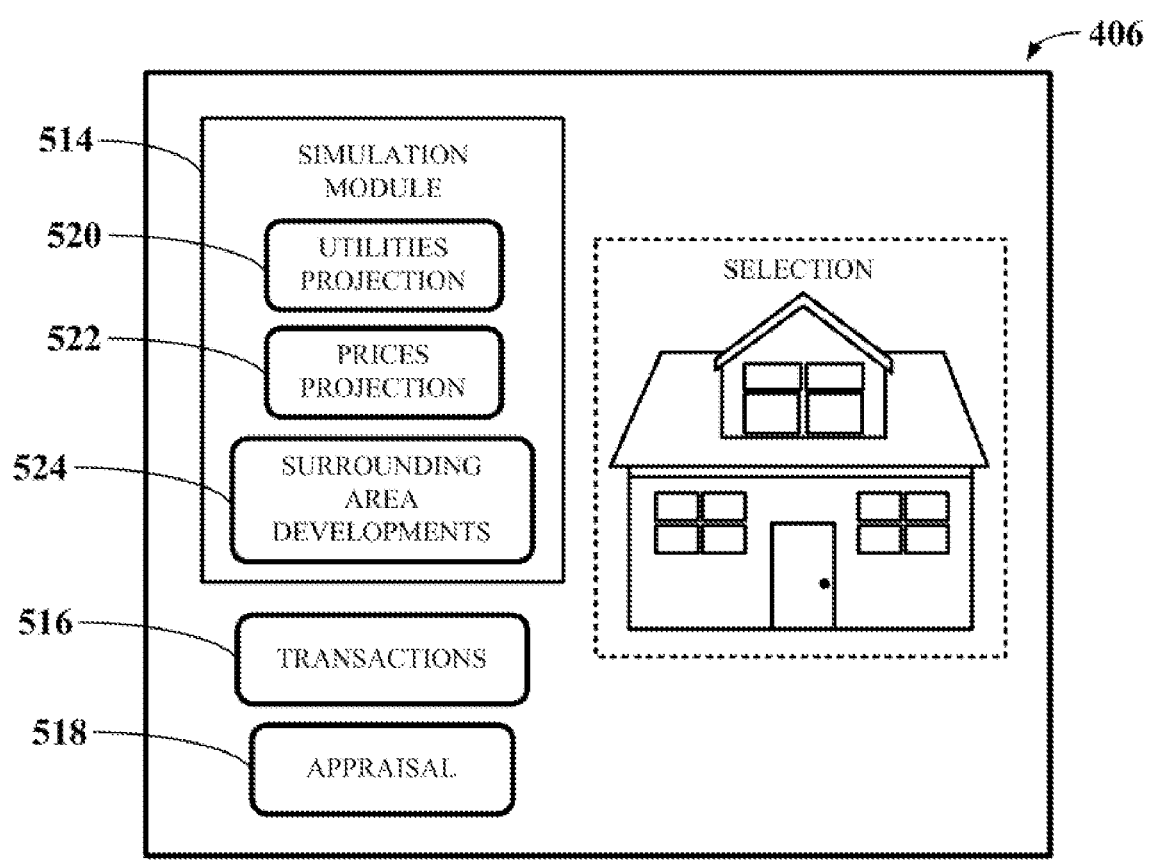

FIGS. 5A-5B depict schematic representations of modules of the real estate marketplace 406, according to an embodiment. Some elements of FIGS. 5A-5B may refer to similar or the same elements of FIGS. 1-4 and thus may use the same reference numbers.

Making reference to FIG. 5A, the real estate marketplace 406 comprises a plurality of modules enabling user interactions with the virtual replicas of the real estate properties. The plurality of modules and data required for each module may be stored in the memory of the server and may be updated by the multi-source data captured by the sensing mechanisms. The plurality of modules of the real estate marketplace 406 may comprise, for example, a map/area search module 502, a keyword search module 504, a parameter filtering module 506, and a recommender module 508, although other modules may also be included.

The map/area search module 502 enables users to search for a real estate project 432 by using an interactive map comprising real-world spatial data of the property. The keyword search module 504 uses keyword search algorithms to retrieve, from the marketplace database, keywords that match the description of the search and accordingly provide the options to the users. The parameter filtering module 506 filters preferences based on one or more parameters selected by the user.

The recommender module 508 may enable providing ranking and filtering of projects to users through collaborative filtering 510, simulated filtering 512, or combinations thereof, which may be run by the server via simulation engines or through external simulation platforms. Collaborative filtering 510 enables recommending and filtering projects based on collecting and analyzing a large amount of information on users behaviors, activities or preferences and predicting what users will like based on their similarity to other users. For example, collaborative filtering 510 may be based on comparing positive or negative appraisals of real estate projects 432 and then matching projects related to the user's preferences for making recommendations. Collaborative filtering 510 may use, for example, algorithms such as k-nearest neighbor (k-NN) and Pearson Correlation. Simulated filtering 512 may enable running goal-based simulations of a city and then matching the simulation results with the projects that best fit the goals in order to provide recommendations and corresponding ranking and filtering.

In an embodiment, the simulated filtering includes running goal-based simulations (which may be based at least in part on captured multi-source data from real-world elements) to obtain simulation results and comparing the simulation results with one or more aspects of the projects. For example, simulated filtering 512 may simulate and filter preferences based on lower utility costs projections, higher real estate prices projections, lower $CO_2$ production for a pre-determined amount of time, or any other projection-related criteria.

In an illustrative scenario, a virtual version of real estate project may include, for example, a virtual replica of a real-world subway system, which may be updated with captured data from sensors that measure $CO_2$ emissions and/or power consumption in the subway system. In this scenario, a carbon emission or power consumption simulation of the project may be performed based at least in part on captured $CO_2$ sensor data and/or power consumption data. The simulations may indicate, for example, a reduction or increase in overall $CO_2$ emissions or power consumption linked to an extension of the subway system to a proposed real estate project in an area of the city, which may be compared with an alternative scenario in which the subway system or other public transportation system is not extended to that area.

Making reference to FIG. 5B, once a target real estate property has been selected, further modules may be displayed to a user within the real estate marketplace 406, such as a simulation module 514, a transactions module 516 to enable transactions between users and real estate properties, and an appraisal module 518 to add a personal evaluation of the real estate projects so that other users can use in their investment decision. The simulation module 514 may further comprise a utilities projection module 520, prices projection module 522, and surrounding area developments module 524.

The utilities projection module 520 uses historical records of consumption data of utilities such as water, electricity, or gas, for a predetermined period of time in order to make utility projections that can help users in their investment decision. In further embodiments, the historic utilities consumption and real-time data (e.g., sensor data) are processed by the processor of the server to simulate utility consumption behavior and estimated costs for users to use during an investment decision. Hence, a user may approach a real estate project 432 and may view the historic utility costs of each of the different real estate projects 432. The real estate prices projection module 522 may base real estate price simulations on a historical real estate price and future developments that may affect the real estate project 432 price. The surrounding area developments module 524 may use data from a city administration in order to simulate and integrate future developments of the real estate in the area surrounding the target real estate property. This data may also be used in the other projection modules, such as in the utilities projection module 520 and prices projection module 522.

Figure 6:
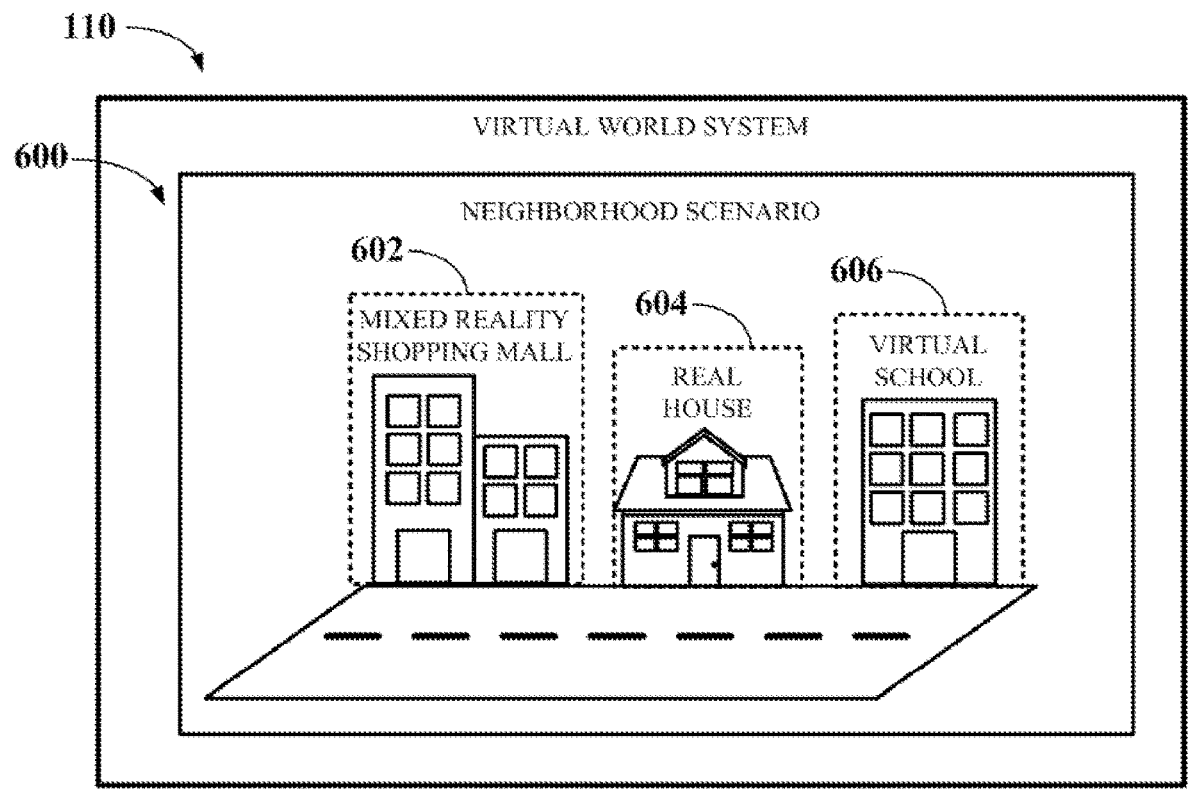
FIG. 6 depicts a schematic representation of a neighborhood scenario in a virtual world system where a user can view and transact real estate properties, according to an embodiment.

FIG. 6 depicts a schematic representation of a neighborhood scenario 600 in a virtual world system 110 where a user can view and engage in transactions relating to real estate properties, according to an embodiment. Some elements of FIG. 6 may refer to similar or the same elements of FIGS. 1-5B and thus may use the same reference numbers.

As depicted in FIG. 6, various embodiments are depicted within neighborhood scenario 600, such as a mixed reality shopping mall 602, a real house 604, and a virtual school 606.

The mixed reality shopping mall 602 may be an existing shopping mall comprising some features that may only be displayed to users virtually, such as in augmented reality. The virtual features may be recreation areas, stores, restaurants, or other areas that are not yet built. The virtual features may also represent ads, information, mini-games, etc. from the different areas. The real house 604 may represent a house that has been fully built and that is ready for display to potential investors, and which can be virtually augmented to show potential improvements or further information on the property. The virtual school 606 may represent a future project that can be viewed in augmented reality. These embodiments can also be viewed and interacted with users remotely (e.g., in virtual reality).

In the current disclosure, the term "persistent" may be used to characterize a state of a system that can continue to exist without a continuously executing process or network connection. For example, the term "persistent" may be used to characterize the virtual world system where the virtual world system and all of the virtual replicas, purely virtual objects and digital reality applications therein comprised continue to exist after the processes used for creating the virtual replicas, purely virtual objects and digital reality applications cease, and independent of users being connected to the virtual world system. Thus, the virtual world system is saved in a non-volatile storage location, e.g., in a server. In this way, virtual replicas, purely virtual objects and digital reality applications may interact and collaborate with each other when being configured for accomplishing specific goals even if users are not connected to the server.

Figure 7:
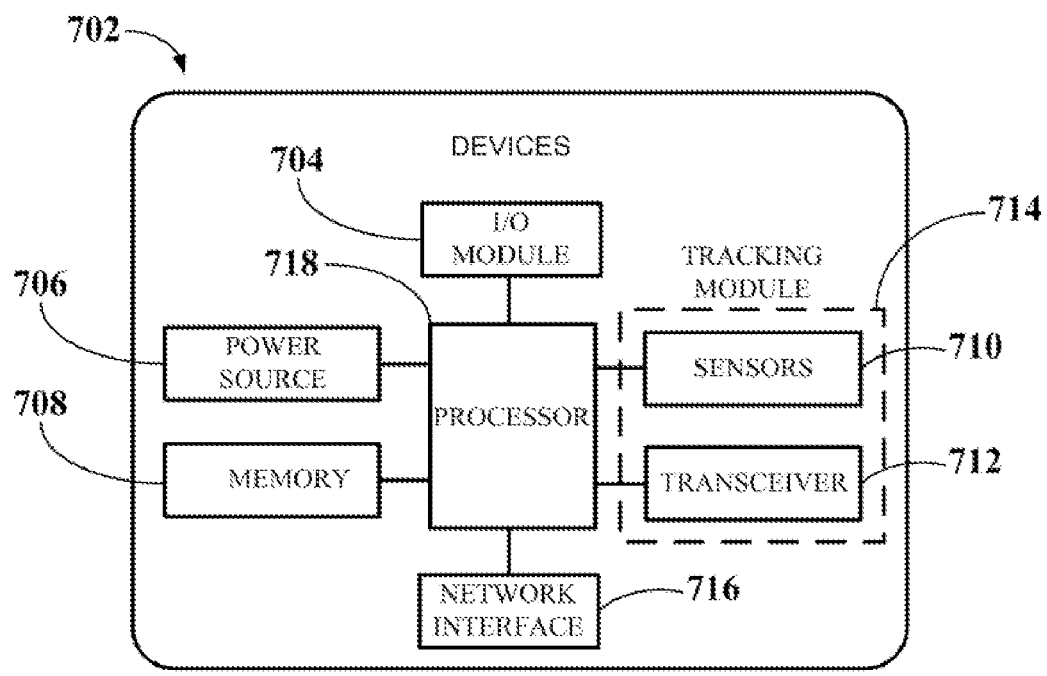
FIG. 7 depicts a block diagram of devices that can be used in systems of the current disclosure, according to an embodiment.

FIG. 7 depicts a block diagram of devices 702 that can be used in systems of the current disclosure, according to an embodiment.

A device 702 may include operational components such as an input/output (I/O) module 704; a power source 706; a memory 708; sensing mechanisms 710 and transceivers 712 forming a tracking module 714; and a network interface 716, all operatively connected to a processor 718.

The I/O module 704 is implemented as computing hardware and software configured to interact with users and provide user input data to one or more other system components. For example, I/O module 704 may be configured to interact with users, generate user input data based on the interaction, and provide the user input data to the processor 718 before being transferred to other processing systems via a network, such as to a server. In another example, I/O modules 704 is implemented as an external computing pointing device (e.g., a touch screen, mouse, 3D control, joystick, gamepad, and the like) and/or text entry device (e.g., a keyboard, dictation tool, and the like) configured to interact with other connected elements. In yet other embodiments, I/O module 704 may provide additional, fewer, or different functionality to that described above.

The power source 706 is implemented as computing hardware and software configured to provide power to the device 702. In one embodiment, the power source 706 may be a battery. The power source 706 may be built into the devices or removable from the devices, and may be rechargeable or non-rechargeable. In one embodiment, the devices may be repowered by replacing one power source 706 with another power source 706. In another embodiment, the power source 706 may be recharged by a cable attached to a charging source, such as a universal serial bus ("USB") FireWire, Ethernet, Thunderbolt, or headphone cable, attached to a personal computer. In yet another embodiment, the power source 706 may be recharged by inductive charging, wherein an electromagnetic field is used to transfer energy from an inductive charger to the power source 706 when the two are brought in close proximity, but need not be plugged into one another via a cable. In another embodiment, a docking station may be used to facilitate charging.

The memory 708 may be implemented as computing hardware and software adapted to store application program instructions and to store multi-source data captured by the sensing mechanisms 710. The memory 708 may be of any suitable type capable of storing information accessible by the processor 718, including a computer-readable medium, or other medium that stores data that may be read with the aid of an electronic device, such as a hard-drive, memory card, flash drive, ROM, RAM, DVD or other optical disks, as well as other write-capable and read-only memories. The memory 708 may include temporary storage in addition to persistent storage.

The sensing mechanisms 710 may be implemented as computing hardware and software adapted to obtain multi-source data from the real world and determine/track the position and orientation of the device 702 and, therefore, of the one or more real-world elements to which the device 702 may be linked. The sensing mechanisms 710 may include, without limitations, one or more include one or more temperature sensors, proximity sensors, inertial sensors, infrared sensors, pollution sensors (e.g., gas sensors), pressure sensors, light sensors, ultrasonic sensors, smoke sensors, touch sensors, chromatic sensors, humidity sensors, water sensors, electrical sensors, or combinations thereof. In particular, the sensing mechanisms 710 include one or more Inertia Measuring Units (IMUs), accelerometers, and gyroscopes. The IMU is configured to measure and report the velocity, acceleration, angular momentum, speed of translation, speed of rotation, and other telemetry metadata of device 702 by using a combination of accelerometers and gyroscopes. Accelerometers within the IMU and/or configured separate from the IMU may be configured to measure the acceleration of the interaction device, including the acceleration due to the Earth's gravitational field. In one embodiment, accelerometers include a tri-axial accelerometer that is capable of measuring acceleration in three orthogonal directions.

The transceivers 712 may be implemented as computing hardware and software configured to enable devices to receive wireless radio waves from antennas and to send the data back to the antennas. In some embodiments, mmW transceivers 712 may be employed, which may be configured to receive mmW wave signals from antennas and to send the data back to antennas when interacting with immersive content. The transceiver 712 may be a two-way communication transceiver 712.

In an embodiment, the tracking module 714 may be implemented by combining the capabilities of the IMU, accelerometers, and gyroscopes with the positional tracking provided by the transceivers 712 and the accurate tracking, low-latency and high QOS functionalities provided by mmW-based antennas may enable sub-centimeter or sub-millimeter positional and orientational tracking, which may increase accuracy when tracking the real-time position and orientation of device 702. In alternative embodiments, the sensing mechanisms 710 and transceivers 712 may be coupled together in a single tracking module device.

The network interface 716 may be implemented as computing software and hardware to communicatively connect to a network, receive computer readable program instructions from the network sent by the server or by other devices, and forward the instructions for storage in the memory 708 for execution by the processor 718.

The processor 718 may be implemented as computing hardware and software configured to receive and process instructions. For example, the processor 718 may be configured to provide imaging requests, receive imaging data, process imaging data into environment or other data, process user input data and/or imaging data to generate user interaction data, perform edge-based (on-device) machine learning training and inference, provide server requests, receive server responses, and/or provide user interaction data, environment data, and content object data to one or more other system components. For example, the processor 718 may receive user input data from I/O module 704 and may respectively implement application programs stored in the memory 708. In other examples, the processor 718 may receive multi-source data from sensing mechanisms 710 captured from the real world, or may receive an accurate position and orientation of device 702 through the tracking module 714, and may prepare some of the data before sending the data to a server for further processing.

Figure 8:
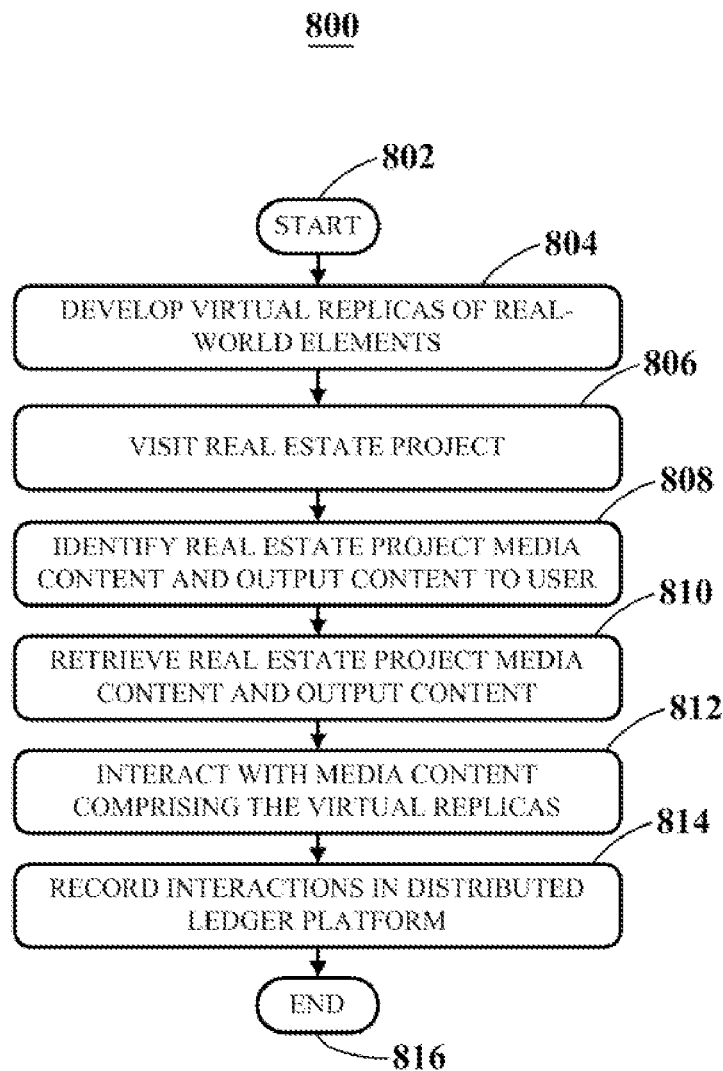
FIG. 8 depicts a block diagram of a method for providing digital reality experiences and decentralized transactions of real estate projects, according to an embodiment.

FIG. 8 depicts a block diagram of a method 800 for providing digital reality experiences and decentralized transactions of real estate projects 432, according to an embodiment.

According to an embodiment, a method 800 enabling digital reality experiences and decentralized transactions of real estate projects begins in blocks 802 and 804 by developing virtual replicas of real estate projects and storing the virtual replicas in a memory of a server, the virtual replicas comprising data models and data of the real estate projects and instructions for processing the virtual replicas by a processor. The method 800 continues in block 806 by visiting, employing a user device, a real estate project, which can be done physically or virtually.

Once a user is physically or virtually in the area of the real estate project, the method 800 continues in block 808 by identifying, by the user device, virtual replicas within a real estate project. Subsequently, in block 810, the method 800 continues by retrieving real estate project media content comprising the virtual replicas and outputting the content to the user via the user device. The method 800 then proceeds in block 812 by the user interacting with the media content, and finally, in blocks 814 and 816, by recording interactions in a distributed ledger, such as via the distributed ledger platform 118 of FIG. 1.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A system enabling digital reality experiences, the system comprising:
 a server comprising a memory and a processor, the memory storing data of a virtual replica of a real estate property in a database and instructions for processing the data of virtual replica, and the processor being configured to process the data of virtual replica;
 wherein the server is connected to a user device via a network,
 wherein the server is configured to connect to a distributed ledger platform recording a decentralized record of an interaction with media content comprising the virtual replica of the real estate property,
 wherein the interactions with the media content comprise a transaction with the virtual replica of the real estate property, and
 wherein the decentralized records a smart contract enabling property ownership.

2. The system of claim 1, wherein the user device is configured to detect and track a virtual object and to output media content.

3. The system of claim 1, wherein the property ownership is a fractional ownership of a property associated with the virtual replica of the real estate property.

4. The system of claim 1, wherein the virtual replica of the real estate property is associated with at least one real estate project stored in a project database, and
 wherein the at least one real estate project comprises at least one of an unbuilt real estate project, an already-built real estate projects, or a combination thereof.

5. The system of claim 1, wherein the digital reality experiences comprise visualizing and performing transactions on identified real estate properties in areas surrounding a target real estate property.

6. The system of claim 1, further comprising data models of the virtual replica,
 wherein the data models comprise at least one of a 3D model, a dynamic model, a geometric model, a machine learning model, or a combination thereof.

7. The system of claim 1, wherein the virtual replica represents an already-built real estate property,
 wherein the already-built real estate property comprises a real object, and
 wherein the real object comprises a connected device with a sensing mechanism configured to obtain real-time data from the real object to enrich and synchronize the virtual replica.

8. The system of claim 1, wherein the memory of the server further stores a historic utilities consumption module, and
 wherein historic utilities consumption data and real-time sensor data are processed by the processor of the server to simulate utility consumption behavior and estimated costs.

9. The system of claim 1, wherein the memory of the server further comprises:
 a real estate price projection module based on a historical real estate price and future developments; or
 a recommender module for providing ranking and filtering of projects to users through collaborative filtering or simulated filtering.

10. The system of claim 1, wherein the system employs a cloud to edge distributed computing infrastructure, and
 wherein the network comprises millimeter-wave (mmW) or combinations of mmW and sub 6 GHz communication systems, or a wireless local area network (Wi-Fi).

11. A method enabling digital reality experiences, the method comprising:
 developing a virtual replica of a real estate property;
 storing the virtual replica in a memory of a server, the virtual replica comprising data of the real estate property and instructions for processing the virtual replica by a processor;
 connecting the server to a distributed ledger platform recording a decentralized record of a transaction associated with the virtual replica of the real estate property, the decentralized record comprising a smart contract recorded based on the transaction to enable property ownership;

retrieving real estate media content comprising the virtual replica; and outputting the real estate media content to a user device.

12. The method of claim 11, further comprising recording interactions and life-cycle of the virtual replica in the distributed ledger.

13. The method of claim 11, wherein the property ownership is a fractional ownership of a property associated with the virtual replica of the real estate property.

14. The method of claim 11, wherein the virtual replica of the real estate property is associated with at least one real estate project stored in a project database, and
   wherein the at least one real estate project comprises at least one of an unbuilt real estate project, an already-built real estate project, or a combination thereof.

15. The method of claim 11, further comprising visualizing and performing transactions on identified real estate properties in areas surrounding a target real estate property.

16. The method of claim 11, wherein the virtual replica represents an already-built real estate property,
   wherein the already-built real estate property comprises a real object, and wherein the real object comprises a connected device with a sensing mechanism configured to obtain real-time data from the real object to enrich and synchronize the virtual replica.

17. The method of claim 11, wherein the memory of the server further comprises a recommender module for providing ranking and filtering of projects to users through collaborative filtering or simulated filtering.

18. The method of claim 11, wherein the server is included in a system employing a cloud to edge distributed computing infrastructure.

19. The method of claim 11, further comprising exchanging cryptocurrencies resulting from the transaction.

20. A non-transitory computer readable medium having stored thereon instructions configured to cause one or more computing devices to perform steps comprising:
   developing a virtual replica of a real estate property;
   storing the virtual replica in a memory of a server, the virtual replica comprising data of the real estate property and instructions for processing the virtual replica by a processor;
   connecting the server to a distributed ledger platform recording a decentralized record of a transaction associated with the virtual replica of the real estate property, the decentralized record comprising a smart contract recorded based on the transaction to enable property ownership;
   retrieving real estate media content comprising the virtual replica; and
   outputting the real estate media content to a user device.

* * * * *